(12) United States Patent
Savagian et al.

(10) Patent No.: US 8,920,895 B2
(45) Date of Patent: Dec. 30, 2014

(54) PRESSURE-WASH RESISTANT LABEL

(71) Applicant: Brady Worldwide, Inc., Milwaukee, WI (US)

(72) Inventors: Michael D. Savagian, Bryant, WI (US); Jeremy M. Higgins, Roseville, MN (US); Alec J. Davis, Milwaukee, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 13/798,954

(22) Filed: Mar. 13, 2013

(65) Prior Publication Data

US 2014/0272289 A1   Sep. 18, 2014

(51) Int. Cl.
| | |
|---|---|
| *B32B 9/00* | (2006.01) |
| *B32B 33/00* | (2006.01) |
| *G09F 3/02* | (2006.01) |
| *G09F 3/00* | (2006.01) |
| *C08K 3/08* | (2006.01) |
| *C09J 7/02* | (2006.01) |
| *G09F 3/10* | (2006.01) |

(52) U.S. Cl.
CPC ............... *G09F 3/02* (2013.01); *G09F 3/0297* (2013.01); *C08K 3/08* (2013.01); *C09J 7/0296* (2013.01); *G09F 3/10* (2013.01); *C09J 2201/162* (2013.01); *C09J 2201/622* (2013.01); *C09J 2203/334* (2013.01); *C09J 2205/106* (2013.01)
USPC ....... 428/40.1; 428/40.2; 428/40.9; 428/41.1; 428/343

(58) Field of Classification Search
CPC ........ B32B 27/00; B32B 27/06; B32B 27/08; B32B 27/20; B32B 27/36; G09F 3/10; G09F 3/02; G09F 3/0297; C08K 3/08; C09J 7/0296; C09J 2205/106; C09J 2201/162; C09J 2201/622; C09J 2203/334
USPC ............. 428/40.1, 40.2, 40.9, 41.1, 42.1, 343
See application file for complete search history.

(56) References Cited

U.S. PATENT DOCUMENTS

| 5,354,595 | A | * | 10/1994 | Yamamoto et al. | ........... 428/147 |
| 2006/0134406 | A1 | * | 6/2006 | Horigome et al. | ............ 428/343 |
| 2013/0059119 | A1 | | 3/2013 | Campeau et al. | |

FOREIGN PATENT DOCUMENTS

DE         197 24 648 A1     12/1998

OTHER PUBLICATIONS

Machine translation of DE 197 24 648 A1, Jul. 22, 2014.

* cited by examiner

*Primary Examiner* — Patricia L Nordmeyer
(74) *Attorney, Agent, or Firm* — Whyte Hirschboeck Dudek S.C.

(57) ABSTRACT

A pressure wash resistant label comprising:
(A) A topcoat with a first facial surface having a surface roughness in a range of 10 micro-inches (μ-in) (0.254 microns (μm) and 70 μ-in (1.778 μm);
(B) A facesheet in contact with the topcoat and comprising a polymer with a Tg of at least 65° C.;
(C) An optional detectable layer, if present, in contact with the facesheet and comprising metal particles;
(D) An adhesive having a shear adhesion failure temperature (SAFT) of at least 120° C. and in contact with the optional detectable layer if present and if not present, then in contact with the facesheet; and
(E) An optional release liner, if present, in contact with the adhesive.

13 Claims, 1 Drawing Sheet

PRESSURE-WASH RESISTANT LABEL

FIELD OF THE INVENTION

This invention relates to labels. In one aspect the invention relates to labels for use in the food processing industry while in another aspect, the invention relates to labels that are attached to food processing equipment.

BACKGROUND OF THE INVENTION

Many industries require signs and labels to efficiently and effectively identify equipment, product flow through processes, and warn of potential hazards to workers. Signs and labels used in this manner must maintain utility—both legibility and permanence—throughout a reasonable lifespan. Replacement of this type of identification on a daily or even weekly basis is simply unreasonable and impractical. The food and beverage processing industry spans a wide range of industrial operations, and many of these can include significant hazards to workers. In addition, positive identification of processes is required to maintain product quality. Common to almost all of these operations is the requirement of sanitation.

Typically food and beverage processes are run for two shifts out of three in a day, with the third shift reserved for cleaning and sanitation of the equipment. The cleaning is particularly harsh and includes exposures to high-pressure spray, scrubbing, caustic and acidic cleaning chemicals, and sanitizing chemicals. Usually this cleaning is done at elevated temperatures (e.g., 50° C. to 80° C. or even higher). This effort is needed to inhibit the growth of toxic bacteria which could otherwise compromise the efficacy of the end product.

Great efforts are made to be certain that cleanliness and hygiene is maintained. Equipment that is designed to sustain this exposure is required, and typically it comprises stainless steel as it can withstand the cleaning and presents a pore-free surface to minimize the ability of bacterial harborage. The cleaning process, designed to eliminate contaminants on the surface of equipment, makes it especially difficult for identification labels to remain in place. While mechanical attachment can withstand the washing forces and chemical exposures, it can also be compromised by the presence of crevices at attachment points that become a locus for bacterial harborage. Thus the use of a continuous adhesive is desirable for the attachment of signs and labels.

Signs and labels for industrial equipment that are commonplace in other industries are known to fail rapidly when exposed to the harsh conditions of the food and beverage processing operations. If the labels fail by falling off of the equipment to which it is attached, then the additional problem of product contamination can result. While it is common in this industry to use metal detectors to find potential contaminants from the process, these will not find plastic label materials.

What is clearly needed in this industry is the ability to label various process equipment with durable signage that can withstand the cleaning operations while maintaining legibility, and if attachment failure occurs, be readily detectable by process metal detection equipment.

SUMMARY OF THE INVENTION

In one embodiment the invention is a label comprising:
(A) A topcoat having first and second facial surfaces, the first facial surface having a surface roughness in a range of 10 micro-inches (μ-in) (0.254 microns (μm) and 100 μ-in (2.54 μm);
(B) A facesheet having first and second facial surfaces and comprising a polymer with a Tg of at least 65° C., the first facial surface of the facesheet in contact with the second facial surface of the topcoat;
(C) An adhesive having first and second facial surfaces and a shear adhesion failure temperature (SAFT) of at least 120° C., the first facial surface of the adhesive in contact with the second facial surface of the facesheet; and
(D) An optional release liner with first and second facial surfaces, the first facial surface of the optional release liner in contact with the second facial surface of the adhesive.

In one embodiment the invention is a label comprising:
(A) A topcoat having first and second facial surfaces, the first facial surface having a surface roughness in a range of 10 micro-inches (μ-in) (0.254 microns (μm) and 100 μ-in (2.54 μm);
(B) A facesheet having first and second facial surfaces and comprising a polymer with a Tg of at least 65° C., the first facial surface of the facesheet in contact with the second facial surface of the topcoat;
(C) A detectable layer having first and second facial surfaces and comprising metal particles having an average particle size of 5 microns (μm) to 40 μm, the first facial surface of the detectable layer in contact with the second facial surface of the facesheet;
(D) An adhesive having first and second facial surfaces and a shear adhesion failure temperature (SAFT) of at least 120° C., the first facial surface of the adhesive in contact with the second facial surface of the detectable layer; and
(E) An optional release liner with first and second facial surfaces, the first facial surface of the optional release liner in contact with the second facial surface of the adhesive.

DETAILED DESCRIPTION OF THE PREFERRED EMBODIMENT

Definitions

Figure 1:
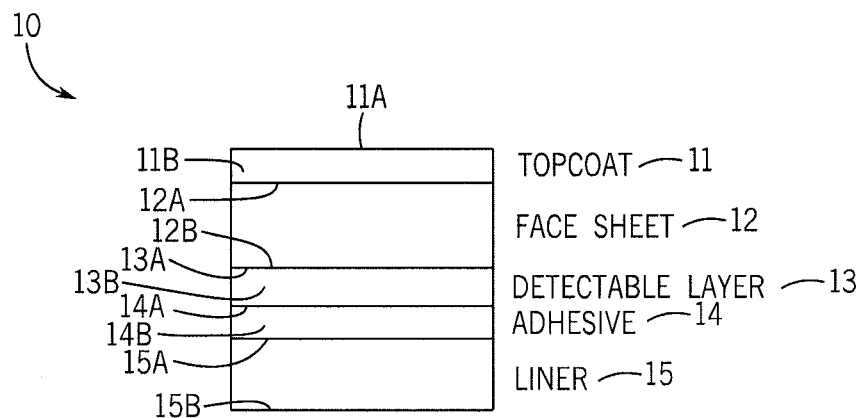
FIG. 1 is a sketch of one embodiment of a label of this invention.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary.

In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, layer or label thickness, is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical values and ranges are provided within this disclosure for, among other things, layer and label thickness, temperature, and the like.

"Layer" means a single thickness, coating or stratum spread out or covering a surface.

"Multilayer" means at least two layers.

"Facial surface", "planar surface" and like terms mean the flat surfaces of the layers that are in contact with the opposite and adjacent surfaces of the adjoining layers. Facial surfaces are in distinction to edge surfaces. A rectangular layer or label comprises two facial surfaces and four edge surfaces. A circular layer or label comprises two facial surfaces and one continuous edge surface.

"In contact", "in direct contact", "in intimate contact" and like terms mean that one facial surface of one layer and one facial surface of another layer, or the adhesive layer of a label and the exterior surface of an object or substrate to which the adhesive layer of the label is applied, are in an adhering relationship to one another without an intermediate layer, such as a coating is in an adhering relationship with the substrate to which it is applied.

"Blocked isocyanate" and like terms mean an isocyanate reaction product which is stable at room temperature but dissociates to regenerate isocyanate functionality under the influence of heat. Blocked isocyanates are typically formed by the reaction of an isocyanate with either an active hydrogen or methylene compound such as a malonic ester.

Label Construction

FIG. 1 is a sketch of one embodiment of a label of this invention. Label 10 comprises topcoat 11 having first and second opposing facial surfaces 11A and 11B with first facial surface 11A open to the environment and second facial surface 11B in contact with first facial surface 12A of facesheet 12. Second facial surface 12B of facesheet 12 is in contact with first facial surface 13A of detectible layer 13, and second facial surface 13B of detectible layer 13 is in contact with first facial surface 14A of adhesive layer 14. Second facial surface 14B of adhesive layer 14 is in contact with first facial surface 15A of release liner 15. To apply label 10 to the surface of an object or article, e.g., food or beverage processing equipment, release liner 15 is simply peeled from adhesive layer 14, and label 10 is applied to the surface such that adhesive layer 14 is in contact with it. If adhesive layer 14 is a PSA, then the label is simply pressed against the surface. If adhesive layer 14 is heat activated, then the surface is heated to the temperature necessary to cure the adhesive and thus bond the label to the surface.

The topcoat is provided to allow end user printability. It is preferably designed to be printable by thermal transfer printing and includes sufficient surface (e.g., 11A in FIG. 1) roughness to provide resistance of the added printed image to scrubbing. The coating is typically within the range of 0.0005 inches (0.0127 mm) to 0.002 inches (0.051 mm) thick, more typically within the range of 0.0007 inches (0.0178 mm) to 0.0015 inches (0.0381 mm).

The composition of the topcoat can vary widely. In one embodiment the topcoat comprises a crosslinked polyester binder with pigments ground to give a roughness in the range of 10 to 100 micro-inches (0.254 to 2.54 microns ($\mu$m)), preferably 20 to 50 micro-inches (0.508 to 1.270 $\mu$m). Alternative topcoats include comprising one or more of polyimide, acrylic, phenoxy, or melamine polymers. Fillers to attain roughness include carbonates, silicates, and oxides, preferably calcium carbonate. Additional fillers to improve opacity, color and appearance such as titanium dioxide and various water insoluble pigments (yellow, green, blue, red, black). Although surface roughness is typically obtained through the inclusion of filler in the topcoat composition, any method that will impart the desired degree of surface roughness to the topcoat can be employed, e.g., physical or chemical abrasion, corona or plasma treatment, etc.

The facesheet is provided to give sufficient stiffness to the label to endure high pressure spray. A common measure of stiffness is Taber Stiffness (ASTM D747-93). The Taber stiffness of the composite label (facesheet and coatings) should be greater than at least 0.5 preferably greater than 6. The facesheet is typically in the form of a film with a typical thickness of 0.003 inches (0.0762 mm) to 0.010 inches (0.254 mm), more typically of 0.003 inches (0.0762 mm) to 0.007 inches (0.1778 mm). The polymer from which the facesheet is made typically does not exhibit a Tg below 65° C., more typically a Tg not below 75° C. Tg is measured by a Differential Scanning calorimeter (DSC) per ASTM D3418. Typically the facesheet comprises a polyester pigmented white for opacity. Alternative and/or additional polymers include, but are not limited to, polyimide, polycarbonate, acrylic, polyethylene naphthalate, and composite constructions with appropriate stiffness and thermal properties.

The optional detectable layer comprises a polymer with detectable metal filler particles such as stainless steel, ferrites, aluminum and the like. Stainless steel particles are preferred as they have the greatest chemical stability when mounted on a stainless steel surface (minimal galvanic corrosion potential). This optional layer is typically of 0.0005 inches (0.0127 mm) to 0.005 inches (0.127 mm) thickness, more typically from 0.002 inches (0.0508 mm) to 0.004 inches (0.1016 mm) in thickness. The polymer used to bind the particles to the face sheet is typically, but not necessarily, the same polymer used in the construction of the topcoat. The absence of this optional metal detecting layer in the label does not have a detrimental effect on the durability of the label.

Particle size is measured using a Coulter LS 13 320 and the maximum particle size is typically less than the coating thickness of the detectable layer. While some larger particles may protrude slightly from the detectable layer, when the pressure sensitive adhesive coating is applied over this layer, they are entirely covered. Preferred embodiments have an average particle size from 5 to 40 microns, more preferably between 20 and 32 microns, with 90% of the particles less than 50 microns. The quantity of the metal per area of the coating results in the metal detectability. For a preferred coat weight of 85 lbs/ream (139 grams/square meter), a coating that comprises 66% metal particles is most preferred (resulting in a mass of 57 lbs/ream (92 grams/square meter) of the particles).

The adhesive is used to attach the label to the end-use surface. Pressure sensitive crosslinked acrylics are preferred with a shear adhesion failure temperature (SAFT) typically above 120° C., more typically above 150° C. Other adhesives with appropriate SAFT that can be used in the practice of this invention include, but are not limited to, hybrid rubber/acrylic, rubber, and thermoset adhesives such as polyester or polyurethane. The thickness of the adhesive layer typically is in the range of 0.0005 inches (0.0127 mm) to 0.003 inches (0.0762 mm), more typically of 0.0009 inches (0.02286 mm) to 0.002 inches (0.0508 mm). SAFT is measured by ASTM D4498-95 using a ChemInstruments Shear Oven System (model SOS-8).

The release liner is any standard (paper or film) release liner, typically silicone coated to protect the adhesive until application and to carry the label stock through a printer. The preferred release liner is either a film type, or a coated paper to give the adhesive a smooth surface to minimize entrapped air when bonded to the end-use surface.

While rigid media can be printed by non-contact methods satisfactorily (such as by inkjet), for best durability thermal transfer print is preferred. For an end user to print its own labels by thermal transfer printing, the label stock must be sufficiently flexible to pass through a commercial thermal transfer printer, as this is a contact method requiring even pressure directly on the label stock. Irregularities result in uneven pressure, so some flexibility is needed to result in good print quality. As such, while greater stiffness gives better resistance to spray washing, it also impedes printability when it exceeds an upper limit. Polyester film labels with appropriate print and metal detectable layers, an adhesive and release liner, are best if they do not exceed 0.007 inches (0.1778 mm) in thickness (stiffness increases greatly with thickness). A common measure of stiffness is Taber Stiffness (ASTM D747-93). Taber Stiffness Units are defined as the bending moment of ⅕ of a gram applied to a 1½" wide specimen at a 5 centimeter test length, flexing it to an angle of 15°. A Stiffness Unit is the equivalent of one gram centimeter.

Label Properties

Spray resistance testing shows failures occurring by adhesive failure. This occurs when an edge is lifted, and then quickly propagates until all or a part of the label is removed. The key to gaining spray resistance is a combination of elevated temperature adhesion and face sheet stiffness. While stiffness can be gained by increasing thickness, this alone will not be successful unless the problem of temperature is addressed. Exposure can range up to 80° C. This can cause the adhesion properties to be reduced. Stiffness also diminishes in most polymeric materials with temperature, markedly so after a material is heated above its glass transition temperature (Tg). Face sheets made from polyester in the range of 0.003 inches to 0.020 inches thick are satisfactory, with greater thickness providing much better resistance. Ideally a thickness in the 0.005 inches to 0.010 inches is desirable, with the thinner side of the range benefiting from additional reinforcement by other coatings (top coat and/or under coat).

Another method of obtaining sufficient stiffness is to form a composite by lamination of thinner layers together with an adhesive of sufficient adhesion and temperature resistance to obtain an overall thickness in the desired range. In this case it is possible to use a laminating adhesive that includes the metal particles required if metal detectability is desired. In this case, the metal particles must be smaller than the thickness of the laminating adhesive layer.

While stiffer, thicker labels can prove difficult to print in standard thermal transfer printers (especially in roll form), much thicker materials can be used if pre-printed and supplied in sheet form.

Adhesives typically lose adhesion as temperature increases. However, cross-linked acrylic pressure sensitive adhesives (PSA) are often an exception to this observation. Particular examples of crosslinked acrylic PSA include DUROTAK 109A from Henkel and MORSTIK 717 from The Dow Chemical Company. Both exhibit sufficient adhesion to endure a 500-psi spray applied at a distance of 5 inches up to 80° C. Higher pressures can be resisted when the spray is restricted to angles above 60 degrees to the surface and/or the spray is from a greater distance. Additionally, using a non-crosslinked adhesive (MORSTIK 123) or an adhesive that has been plasticized by contact with plasticized vinyl (B595) will result in earlier failure at either higher pressure or higher temperatures (see Tables 1 and 2 below).

If the convenience of a pressure sensitive adhesive is not needed, then a thermoset adhesive can be utilized. One example is a crosslinked thermoplastic polyester laminating adhesive.

Scrub resistance is particularly difficult for user-added printing. Even normally durable ribbon inks become abraded by exposure to the abrasive. The "scrubbie" type pad (a pad coated with an abrasive grit) is very effective for removing baked on residues. However the right combination of surface roughness and ribbon quality can produce a very durable image. While a perfectly smooth surface is optimum for thermal transfer imaging, some roughness can be tolerated if a ribbon with sufficient flow at application (print head) temperature is used. The correct surface roughness not only enables good print quality but also protects the ribbon ink that flows into the valleys sufficiently to endure some scrubbing, especially if the roughness is imparted by a durable coating (polymer and filler blend). While some ink is inevitably removed by the grit in a "scrubbie" pad, there is enough left in the valleys of a rough coating to maintain the legibility of a safety sign. A surface roughness (Ra) greater than 10 microinches results in good scrub resistance with a suitable thermal transfer ribbon. A surface roughness in excess of 70 microinches results in poor quality printing.

Metal detectability is imparted by including a metal in the construction. As noted above, aluminum is unsatisfactory due to its incompatibility with both high and low pH cleaners. Additionally aluminum is avoided in the food and beverage industry because this industry almost exclusively uses stainless steel equipment. In a wet environment galvanic corrosion can occur between aluminum and stainless steel. To impart metal detectability to a label, stainless steel is incorporated into the label in a sufficient quantity such that it can be effectively detected with standard metal detectors.

While it may suffice to use a sheet of stainless steel, it becomes a problem to cut it and not impart coining (corrugation) at the cut edge to some degree. Even a small degree of coining can cause a defect in adhesion at the edge, which is the most critical location for both spray resistance and resistance to bacterial harborage. As such, a magnetically detectable grade of stainless steel dispersed in a coating, either as an undercoat, or as a laminating layer within an adhesive, can be both detectable and durable.

Figure 2:
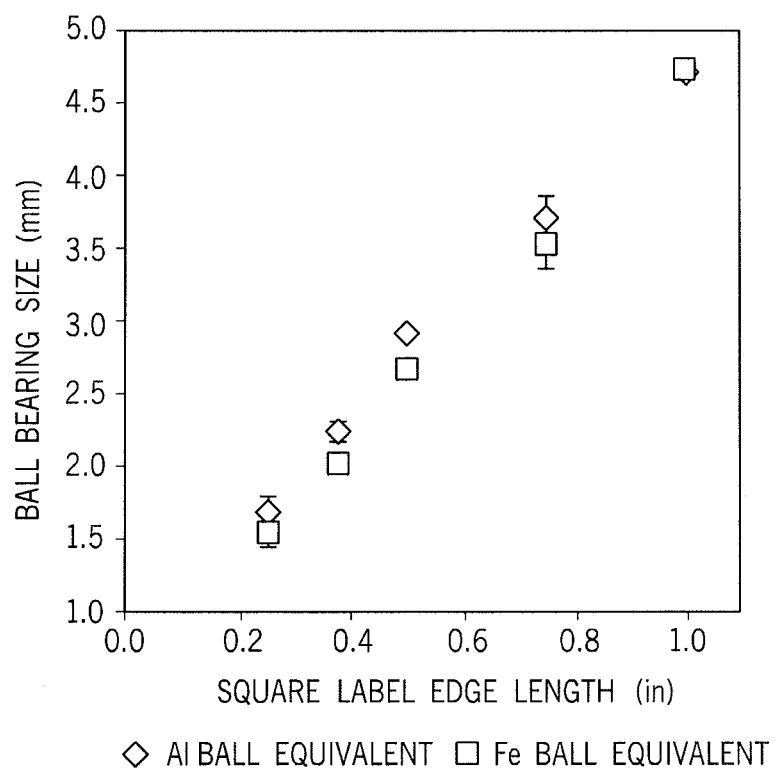
FIG. 2 is a line graph reporting the detectability of various sizes of aluminum and iron ball bearings on a conveyor moving at 100 feet per minute (ft/min).

In any construction the metal detectability feature can only be effective if the metal containing layer stays integral with the other layers. Preferably, the adhesion of the metal detecting layer to the layers above and below it is greater than the adhesion of the label to the surface to which it is applied. Sufficient adhesion is a function of the surfaces to which the stainless steel is coated or laminated as well as the nature of the binding polymer and the ratio of particles to binder, and the size distribution and type of particles. Detectability can be enhanced by increasing particle loading, however adhesion between layers is typically sacrificed for this gain. As discussed, the mass of metal particles per area results in the metal detectability. This can be accomplished with higher particle loading, or higher coat weight. A loading in the range of 30 to 80 weight percent of metal particles will be detectable, preferably 45 to 75 weight percent and most preferably 60 to 70 weight percent at coat weights in the range of 40 to 140 pounds/ream (65 to 228 grams/square meter), preferably 60 to 120 pounds/ream (98 to 196 grams/square meter) and most preferably from 75 to 105 pounds/ream (122 to 171 grams/square meter). The mass of metal particles per area should be at least 35 pounds/ream (57 grams/square meter), with detectability improving at higher metal mass/area. An optimal compromise (as shown in the Example) is a ratio of about 2 parts by weight of magnetic stainless steel particles to 1 part of polyester binder (67 weight percent) at a coat weight of 85 pounds/ream (139 grams/square meter) resulting in a metal mass/area of 57 pounds/ream (93 grams/square meter). Again, the Example shows a good compromise of cost, coat weight and performance. FIG. 2 reports the detectability of the example at various sizes compared to equivalent aluminum or iron ball bearings at 100 feet/minute on a conveyer.

In addition to these features, the label materials should be easy to install, and while standard pre-printed text and graphics are needed, in addition the user can make one of a kind labels for identification and labeling of unique equipment and/or hazards using commercially available printing equipment. For industrial applications requiring good durability, thermal transfer printing, is commonly used in which an ink is transferred with heat (supplied by a printhead) from a ribbon to the printed surface.

EXAMPLES

The following examples were performed to test the effectiveness of inventive and known label constructions. The labels were tested to measure their relative performance with several adhesives when coated to a 10 mil (0.254 mm) thick polyester film.

Example Set 1

Sample Preparation

Each of labels A, B and C were prepared by coating a 10 mil (0.254 mm) polyester film (Mylar Type A from DuPont Teijin Films) with an adhesive at a rate of 30 pounds per ream (48.9 grams/square meter) and then dried at 300° F. (149° C.) for 3 minutes. The adhesive used for label A was DUROTAK 109A, a crosslinked acrylic pressure sensitive adhesive with SAFT>200C from Henkel; for label B it was MORSTIK 717, a crosslinked acrylic pressure sensitive adhesive with SAFT>200C from Dow; and for label C it was MORSTIK 123, a styrene butadiene rubber based pressure sensitive adhesive with 85C SAFT also from Dow. Label D was prepared by coating the 10 mil polyester film with a heat activated adhesive made from 90 parts thermoplastic polyester adhesive (ADCOTE 1140 from The Dow Chemical Company) and 5 parts blocked isocyanate crosslinker (RAA-3061 from Royce) and dried for 3 minutes at 200° F. (93° C.) so as not to unblock and thus activate the crosslinker. SAFT for the crosslinked polyester was not measured, as it is greatly increased once activated, but not before. Brady B595 was used for comparison, however it is based on a hybrid rubber acrylic pressure sensitive adhesive with very low SAFT (<80C) due to the effects of the plasticizer in the PVC backing migrating into and softening the adhesive.

Samples were cut to credit card size (86 mm×54 mm with 3 mm radius corners) and laminated to stainless steel panels. The panel for label D was subsequently heated to 160° C. for 30 minutes to crosslink the thermoplastic polyester. All samples were allowed to build adhesion for 4 hours prior to spray testing.

Samples were exposed to spray test described below (5-revolutions per minute (rpm)) turntable speed and sprayed for 30 seconds each at 0, 30, 90, and 60 degree angles). Testing was done at 500 psi (3.45 MPa) at flow rates set between 3.5 and 4 gallons per minute (13.2 to 15.1 liters/minute) (to attain the correct pressure with the required nozzle). The temperature of the water started at pipe/tap temperature (10° C.) and after each spray cycle (all angles) the temperature increased by 10° C. starting at 30° C. (the lowest heater temperature setting) and increasing to 90° C. Testing went until failure which was defined as lifting of an edge as detected by the change in deflection of the spray.

One label material that is very successful in many industrial applications was used for comparison. This label material (B595 from Brady Corporation) is made from a durable thermal transfer printable vinyl face sheet and an aggressive hybrid (acrylic and rubber) pressure sensitive adhesive. This label has been used commercially in various food and beverage processing applications but found to have a short life because of the face sheet, the added print, or the adhesive. Additionally, many different label types were also tried in the use simulation test (described below) with varied results. None could sufficiently endure all of the parameters, with shortcomings found in all of the tested attributes.

Tests and Tests Results

Spray Resistance

To determine resistance to high pressure spraying two procedures were developed. One is a use simulation describe below. Also developed was a test based on an industry standard for equipment used in processes with high pressure, high temperature spray (DIN40050-9 IP-69K rating). This test includes a turntable that rotates a test sample and a 25 degree angle fan spray (25 degree included angle) at angles of 0, 30, 60, and 90 degrees impinging on the sample. One cycle consists of 30 seconds exposure at each angle by high-pressure spray at 4 gallons/minute at elevated temperature. Temperature, pressure, time or cycles to fail can be noted. As this test is done in very close proximity to the sample (4 to 6 inches), it can cause unrealistically high pressures, as most cleaning is done from a 12 to 24 inch range. As such, testing proceeded at a lower pressure (500 psi nozzle pressure) than that used in the use simulation tests (described below).

Spray Resistance Tests Results

The results of the spray resistance tests are reported in Tables 1 and 2.

TABLE 1

| 500 psi (#10 Nozzle, 3.56 gpm, 25° Spray Angle | | | | |
|---|---|---|---|---|
| SAMPLE | FAIL TIME | FAIL TEMPERATURE | FAIL ANGLE | COMMENTS |
| Morstik 717 | 17:06 | 90 C. | 30° | Edge lift |
| Durotak 109A | 21:13 | 90 C. | 30° | Edge lift on 3$^{rd}$ |

TABLE 1-continued 500 psi (#10 Nozzle, 3.56 gpm, 25° Spray Angle)

| SAMPLE | FAIL TIME | FAIL TEMPERATURE | FAIL ANGLE | COMMENTS |
|---|---|---|---|---|
| Morstik 123 | 14:24 | 80 C. | 30○ | 90 C. cycle Edge lift |
| Xlink PET | No Failure | n/a | n/a | No failure |
| B595 | 2:57 | 30 C. | 30○ | Edge slides & rolls |

This shows that the crosslinked acrylic adhesives (MORSTIK 717 and DUROTAK 109A) could withstand the close proximity pressure spraying at temperatures up to 90° C., while the non-crosslinked styrene butadiene rubber based adhesive with low SAFT (85° C.) cannot endure this exposure. The crosslinked polyester based heat-activated adhesive does not fail in this exposure, while the B595 with the flexible plasticized PVC backing and very low SAFT fails very early on. Additionally all failures occur at the 30 degree spray angle. The B595, while a very useful label material, is designed to only support itself. To endure the additional pressure from the spray requires and adhesive with more heat resistance and a much stiffer backing.

Scrub Resistance

To determine resistance to scrubbing, a linear wash test was developed. A green, heavy duty "scrubbie" (3M Scotch-BRITE Heavy Duty Scouring Pad #86 designed for cleaning food processing equipment) cut to 1 inch×1 inch (25.4 mm×25.4 mm) is rubbed cyclically across a sample at a rate of 30 cycles (back and forth) per minute that is immersed in room temperature (20° C.) water with 2 psi of pressure. This is repeated for hundreds of cycles to determine the effect on legibility of print.

TABLE 2

Scrub Resistance Test Results

| Material | Type | Ra | Lwash Score |
|---|---|---|---|
| B634 | Print Coated Polyester Film | 1.1 | 4 |
| B509 | Vinyl Film | 1.3 | 4 |
| B721 | Print Coated Polyester Film | 3 | 3 |
| B483 | Print Coated Polyester Film | 3.3 | 3 |
| B423 | Print Coated Polyester Film | 4 | 3 |
| B595 | Vinyl Film | 7.9 | 3 |
| B656 | Print Coated Polyimide Film | 8.5 | 3 |
| B497 | Print Coated Polyimide Film | 12.2 | 2 |
| B429 | Print Coated Polyimide Film | 16.4 | 2 |
| B619 | Print Coated Polyimide Film | 26.3 | 2 |
| B488 | Print Coated Polyimide Film | 29.4 | 2 |
| B500 | Vinyl Coated Cloth | 152.7 | unprintable |
| B502 | Vinyl Coated Cloth | 238.3 | unprintable |

Various label products from Brady Corporation were measured for Ra (surface roughness in micro-inches) per JIS B0601 2001 on a MITUTOYO SJ-400. They were printed with a thermal transfer printer (Brady BBP 31) and tested per the scrub test above for 1000 cycles. The print was subjectively evaluated on a 1 (good), 2 (fair), 3 (poor), and 4 (bad) scale. While all had some print removal, none were considered good, however a number were rated fair indicating that the text was legible and a label or sign would be serviceable (convey the message).

While a smooth coating developed for thermal transfer printable products can produce a high quality image, it is apparent that if the surface roughness (Ra) is too low (less than 10) the image cannot endure this type of scrubbing. If it is too high (greater than 100) the surface is too uneven to print by this method. Thus it is significant to this invention to have a surface roughness between 10 and 100 to enable a scrub resistant label or sign that is user printable by thermal transfer printing.

Metal Detectability

Metal detectability was determined by the use of a metal detector common in the industry (SAFELINE by Mettler Toledo Safeline). Sensitivity was set for detection of various diameter ball bearings of both aluminum and iron. Detectors are set in industry for various sensitivities (corresponding to different diameter ball bearings) to prevent false positives, yet detect potential contaminants.

Metal Detectability Test Results

The graph in FIG. 2 below shows the correlation of the label size (square label) to calibration ball diameter for a label with the detection layer of the preferred embodiment (85 pounds/ream coat weight of a coating as described in Example Set 2.) This illustrates the minimum detectable label size (by edge length) for a metal detector with sensitivity set to the ball diameter indicated. Smaller labels (or equivalent pieces of metal) cannot be detected. Labels and label pieces larger than this size can be detected.

Use Simulation

Labels were mounted to a stainless steel panel and then cycles consisting of spray rinse, chemical exposure, scrubbing, and sanitizing were performed as described in Table 3.

TABLE 3

Accelerated Testing Cycle

| Step | Product | Concentration | Temperature | Time |
|---|---|---|---|---|
| Pre-rinse | Water | | 70° C. | 60 s |
| Wash | ENFORCE | 39.1 ml/L | RT | 120 s |
| Rinse | Water | | 70° C. | 60 s |
| Sanitation A | 1-4: MADISAN 75 | 2.7 ml/L | RT | 30 s |
| Sanitation B | Every 5$^{th}$ cycle | 20.3 ml/L | RT | 30 s |

ENFORCE is a foaming alkaline cleaner from Ecolab and used at the recommended concentration of 39.1 ml/L of water. MADISAN is a quaternary ammonium sanitizer from Madison Chemical used at the recommended concentration of 2.7 ml/L of water. VORTEXX is a peroxy-acid sanitizer from Ecolab used at the recommended concentration of 20.3 ml/L of water.

The test cycle represented one day of end use as food and beverage processing facilities are cleaned on a daily basis to maintain sanitation. This was repeated to simulate months of use. As the cycling proceeded, spray pressure for the pre-rinse and rinse cycles was increased and spray temperature was increased to best differentiate between the samples as reported in Table 4 (all spray is through a 25 degree included angle nozzle at 3.5 to 4.0 gallons/minute) (13.2 to 15.1 liters/minute).

TABLE 4

| Cycle Descriptions | | | |
|---|---|---|---|
| Cycle | PSI | °C. | Distance(in.) |
| 1-130 | 500(3.45 MPa) | 70 | 12-18(304.8-457.2 mm) |
| 131-160 | 1000(7.9 MPa) | 70 | 12-18(304.8-457.2 mm) |
| 161-180 | 1000(7.9 MPa) | 70 | 6-12(152.4-304.8 mm) |
| 181-200 | 1000(7.9 MPa) | 90 | 6-12(152.4-304.8 mm) |
| 201-240 | 1500(10.35 MPa) | 90 | 6-12(152.4-304.8 mm) |
| 241-260 | 2000(14.8 MPa) | 90 | 6-12(152.4-304.8 mm) |

Use Simulation Test Results

The Use Simulation test is a means to determine the overall effects of use in an accelerated fashion. Labels attached to a large stainless steel panel endure the total of a daily exposure to a washdown cleaning cycle including pressure spray, high temperature, chemical cleaners and sanitizers, and scrubbing every 30 minutes. The ability to endure use of this type and differentiation between label types and designs is established. The test starts with a simulation of lower pressures at a greater distance and proceeds to increase in severity first in pressure (increasing nozzle pressure and then reducing distance). This is followed by increasing temperature and further increasing nozzle pressure at the reduced distance. Failure modes are typically an edge or corner lift, although in some cases the label wrinkles when the substrate is vinyl. It also Shows a failure mode of either poor topcoat adhesion or substrate delamination, illustrating the significance of the cohesion of the label itself. See Table 5 below for results.

Example Set 2

Sample Preparation

A topcoat is prepared by dissolving 15.56 parts by weight of a polyester resin (MORESTER 49000P available from The Dow Chemical Company) into 25.17 parts of nitroethane, 13.24 parts of toluene, and 21.55 parts of methyl ethyl ketone solvents. To this is added 5.96 parts of titanium dioxide pigment which is ground on a high speed Cowles mixer to attain a Hegman of 7.0 or greater per ASTM D1210 using a Hegman gauge. 8.97 parts of magnesium silicate and 8.97 parts of calcium carbonate are added and ground to attain a Hegman of 6.0 or greater. To this is added 0.08 parts of DESMODUR N75 isocyanate crosslinker available from Bayer Material Science at the time of coating. The coating is applied to the facesheet at a coat weight of 12.5 pounds/ream (20.4 grams/square meter) dry. A facesheet is selected from 0.003" (0.0762 mm), 0.005" (0.127 mm), and 0.007" (0.1778 mm) thick white polyester film (MELINEX 329 available from DuPont Teijin Films).

A detectable layer is prepared by dissolving 21.16 parts of a polyester resin (VYLON 270 available from Toyobo) into 14.41 parts of ethyl acetate, 14.41 parts of toluene, and 7.19 parts of xylene. To this 42.31 parts of stainless steel (POLYMAG SS from ErieZ Magnetics are added. At the time of coating 0.53 parts of DESMODUR N75 isocyanate crosslinker available from Bayer Material Science is added. This coating is applied to the back side of the facesheet at a coat weight of 85 pounds/ream (139 grams/square meter) dry.

MORSTIK 717 self-crosslinking acrylic pressure sensitive is coated at 22 pounds/ream (35.9 grams/square meter).

A silicone-coated release liner is laminated to the adhesive to protect it. A clay coated paper liner is used to give a smooth texture to the adhesive.

The following samples are prepared using the above-described procedure:

(E1) 0.007 inch thick MELINEX 329 facesheet with a detectable layer.
(E2) 0.005 inch thick MELINEX 329 facesheet with a detectable layer.
(E3) 0.007 inch thick MELINEX 329 facesheet without a detectable layer.
(E4) 0.005 inch thick MELINEX 329 facesheet without a detectable layer.

All comparative samples are commercially available labels sold into durable use applications.

(C1) B595 user-printable vinyl label with hybrid acrylic/rubber pressure sensitive adhesive from Brady Corporation.
(C2) Graphic Products Vinyl user printable commercially available vinyl label with pressure sensitive adhesive.
(C3) Lighthouse Polyester user printable commercially available polyester label with pressure sensitive adhesive.
(C4) Graphic Products High Tack Polyester user printable commercially available vinyl label with high tack pressure sensitive adhesive.
(C5) B483 user-printable polyester label with/rubber-based pressure sensitive adhesive from Brady Corporation.
(C6) Graphic Products Metal Detectable user printable commercially available polyester label with metal detectable foil layer and pressure sensitive adhesive.
(C7) Lighthouse Vinyl user printable commercially available vinyl label with pressure sensitive adhesive.
(C8) Graphic Products Chemical Resistant user printable commercially available polyester label with chemically resistant topcoat and pressure sensitive adhesive.

Examples and Samples are evaluated for Taber Stiffness (ASTM D747-93) and durability in the use simulation test detailed above. Use simulation cycles in which a defect occurs (typically an edge or corner lift) are noted. The results are reported in Table 5.

TABLE 5

Results of Taber Stiffness and Use Simulation Tests

| Sample ID | Taber Stiffness | Simulation Cycles | Comments |
|---|---|---|---|
| E1 | 27.8 | 261+ | No failure |
| E2 | 10.5 | 252 | Corner lift |
| E3 | 18.3 | 256 | Corner lift |
| E4 | 6.3 | 259 | Corner lift |
| C1 | 0.09 | 212 | Edge lift, shrinkage, wrinkles |
| C2 | 0.07 | 220 | Edge lift, shrinkage, wrinkles |
| C3 | 0.10 | 174 | Edge and corner lift |
| C4 | 0.13 | 160 | Edge and corner lift |
| C5 | 0.14 | 149 | Edge and corner lift |
| C6 | 5.3 | 142 | Foil delamination |
| C7 | 0.03 | 69 | Edge lift |
| C8 | 0.15 | 22 | Topcoat peels up |

The test results clearly show that a high Taber Stiffness is needed for long term durability in a high pressure, high temperature wash down application. The only sample with a Taber Stiffness over 0.5 to fail failed in layers, rather than as a unit. This was due to insufficient interlayer adhesion and while the composite stiffness was high, when delaminated, the stiffness of the layers was too low. The following conclusions are supported by the data:

1. Important to both durability and detectability is the integrity of the label laminate structure;

2. Important to the scrub resistance of the user-added image is the roughness of the print surface; and 3. Important to the durability and temperature resistance is the stiffness of the label and heat resistance (SAFT) of the adhesive.

It is specifically intended that the present invention not be limited to the embodiments and illustrations contained herein, but include modified forms of those embodiments including portions of the embodiments and combinations of elements of different embodiments as come within the scope of the following claims.

We claim:

1. A label having a Taber stiffness of greater than 0.5 and comprising:
    (A) A polymer film topcoat having first and second facial surfaces, the first facial surface having a surface roughness Ra as measured by JIS B0601 2001 on a MITU-TOYO SJ-400 in a range of 10 micro-inches (μ-in) (0.254 microns (μm) and 100 μ-in (2.54 μm);
    (B) A facesheet having first and second facial surfaces and comprising a polymer with a Tg of at least 65° C., the first facial surface of the facesheet in contact with the second facial surface of the topcoat;
    (C) An adhesive having first and second facial surfaces and a shear adhesion failure temperature (SAFT) of at least 120° C., the first facial surface of the adhesive in contact with the second facial surface of the facesheet; and
    (D) An optional release liner with first and second facial surfaces, the first facial surface of the optional release liner in contact with the second facial surface of the adhesive.

2. The label of claim 1 in which the topcoat comprises a polyester binder resin and a pigment.

3. The label of claim 2 in which the topcoat and facesheet comprise polyester.

4. The label of claim 3 in which the first facial surface of the topcoat layer comprises a graphic.

5. The label of claim 4 in which topcoat is 0.0005 inches (0.0127 mm) to 0.002 inches (0.051 mm) thick, the facesheet is 0.003 inches (0.0762 mm) to 0.01 inches (0.254 mm) thick, and the adhesive is 0.0005 inches (0.0127 mm) to 0.003 inches (0.0762 mm) thick.

6. The label of claim 1 in which the facesheet has a Tg of at least 65° C. and comprises a composite of layers.

7. The label of claim 6 in which the layers of the composite are laminated together with an adhesive that is filled with at least 57 g/m² of metal detectable particles.

8. A label having a Taber stiffness of greater than 0.5 and comprising:
    (A) A polymer film topcoat having first and second facial surfaces, the first facial surface having a surface roughness Ra as measured by JIS B0601 2001 on a MITU-TOYO SJ-400 in a range of 10 micro-inches (μ-in) (0.254 microns (μm) and 70 μ-in (1.778 μm);
    (B) A facesheet having first and second facial surfaces and comprising a polymer with a Tg of at least 65° C., the first facial surface of the facesheet in contact with the second facial surface of the topcoat;
    (C) A detectable layer having first and second facial surfaces and comprising at least 57 grams per square meter (g/m²) of metal particles having an average particle size of between 5 microns and 40 microns, the first facial surface of the detectable layer in contact with the second facial surface of the facesheet;
    (D) An adhesive having first and second facial surfaces and a shear adhesion failure temperature (SAFT) of at least 120° C., the first facial surface of the adhesive in contact with the second facial surface of the detectable layer; and
    (E) An optional release liner with first and second facial surfaces, the first facial surface of the optional release liner in contact with the second facial surface of the adhesive.

9. The label of claim 8 in which the topcoat comprises a polyester binder resin and a pigment.

10. The label of claim 9 further comprising a polyester binder and in which the metal particles comprise at least one of stainless steel and ferrites.

11. The label of claim 10 in which the detectable layer is 0.0005 inches (0.0127 mm) to 0.005 inches (0.127 mm) thick.

12. The label of claim 8 in which the facesheet has a Tg of at least 65° C. and comprises a composite of layers.

13. The label of claim 12 in which the layers of the composite are laminated together with an adhesive that is filled with metal detectable particles.

* * * * *